US007071934B1

(12) United States Patent
Faoro et al.

(10) Patent No.: US 7,071,934 B1
(45) Date of Patent: Jul. 4, 2006

(54) METHOD AND APPARATUS FOR VISUALLY-ORIENTED NAVIGATION OF COMPARED OBJECT VERSIONS

(75) Inventors: Michael Anthony Faoro, Cary; Lynn Cleveland Percival, III, Raleigh, both of NC (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/045,014

(22) Filed: Mar. 20, 1998

(51) Int. Cl.
*G06F 3/00* (2006.01)

(52) U.S. Cl. .................... 345/346; 345/338; 345/357; 345/341; 345/973; 345/145; 345/439; 707/511

(58) Field of Classification Search ................ 345/357, 345/335, 344, 342, 341, 973, 974, 338, 145, 345/146, 346, 439; 707/523, 511
See application file for complete search history.

(56) References Cited

U.S. PATENT DOCUMENTS

| 4,443,860 A | * | 4/1984 | Vidalin ........................... 707/1 |
| 4,807,182 A | * | 2/1989 | Queen ........................... 707/511 |
| 4,912,637 A | * | 3/1990 | Sheedy et al. ............... 707/203 |
| 5,297,253 A | * | 3/1994 | Meisel ........................ 345/357 |
| 5,408,659 A | * | 4/1995 | Cavendish et al. .......... 345/335 |
| 5,479,600 A | * | 12/1995 | Wroblewski et al. ........ 345/341 |
| 5,655,094 A | * | 8/1997 | Cline et al. .................. 345/341 |
| 5,659,730 A | * | 8/1997 | Kelley et al. .................. 707/3 |
| 5,945,998 A | * | 8/1999 | Eick ............................ 345/431 |

* cited by examiner

*Primary Examiner*—John E. Breene
*Assistant Examiner*—Tadesse Hailu
(74) *Attorney, Agent, or Firm*—Gregory M. Doudnikoff

(57) ABSTRACT

A technique, system, and computer program for quickly and efficiently navigating through a comparison of different versions of a file. An abstract representation of the detected differences is provided in a separate navigation window or pane. This abstract representation is shown as one or more bars, which are formatted using one color for segments that are the same and a different color for those segments that are different. This allows the user to see, at a high level, the relative size of differences, the relative position of the differences, and how the differences are distributed throughout the files. The user can navigate through the differences using navigation controls that are synchronized between the navigation window (or pane) and a file comparison window. A novel use of hover help is defined. The navigation window and controls can be used with comparisons of any type of ordered data, such as text, audio, video, etc., and with comparisons of any number of versions of a file.

17 Claims, 6 Drawing Sheets

METHOD AND APPARATUS FOR VISUALLY-ORIENTED NAVIGATION OF COMPARED OBJECT VERSIONS

BACKGROUND OF THE INVENTION

1. Field of the Invention

The present invention relates to file management, and deals more particularly with a method and apparatus for quickly and efficiently navigating through a comparison of different versions of a file. The present invention provides a visual abstraction of the detected differences in the files, and can be used with files containing any type of ordered data, such as text (for example, programming source code), audio, video, etc., and with any number of versions of a file.

2. Description of the Related Art

Tools exist which compare different versions of the same file, and present that comparison to the user in a graphical user interface window. Often these tools are comparing source files for programming languages such as C, C++, etc. These comparison tools present the user with a set of detected differences. Typically, the comparison tool presents the information from two files, side by side, with the detected differences indicated in some way (such as using different fonts, different colors, an indication of line numbers where differences exist, etc.). From this comparison, the user examines the differences, and works to resolve them. For example, the user may decide to merge selected parts of the files to eliminate the difference, or he may decide that the difference was intentional and make no change. The files being compared are often large, containing thousands of lines of code, and may have hundreds or even thousand of differences. Additionally, the changes may be widely distributed throughout these thousands of lines of code.

The user typically navigates through the file comparison using standard window scrolling or keyboard manipulation. As an example of using standard window scrolling, a scroll bar will be presented along the side of a window when the file contains more data than can be displayed in that window. The user can move through the file by clicking on the scroll bar (to move one full page forward or back), by clicking on an arrow attached to the scroll bar (to move one line up or down), the user may drag a slider that is positioned on the scroll bar (to move a user-controlled distance forward or back), etc. As an example of using keyboard manipulation, the user may press a Page-Up or Page-Down key, a key representing a single line up or down, etc.

While these existing techniques of navigation allow the user to move around through the compared files, they are not tailored to the specific problem of comparing file differences and resolving those differences. Thus, a number of difficulties are encountered by users of file comparison tools. When the files being compared are very large, using standard window or keyboard controls to move one page or one line at a time is tedious and time-consuming. Some comparison tools avoid this by providing a facility for quickly jumping to the next (or the previous) difference. For example, a toolbar may include icons marked "Next Difference" and "Previous Difference", or buttons may be provided for the "Next" and "Previous" functions. Or, function keys may be specially designated as performing the Next and Previous functions. These facilities present their own difficulties. When the next or previous difference is far removed from the one currently being viewed, jumping to that next or previous difference tends to cause the user to lose much contextual information. Without a clear understanding of the context in which a difference occurs, the user may be prone to making errors when trying to resolve that difference.

What is needed to give the user this contextual information when viewing a comparison of very large files is an abstract representation of the files, showing a visual overview of the detected differences. This overview should include such things as where the differences are located in relation to the overall file layout, the size of the differences in relation to the overall file size, and the distribution of the differences throughout the files. By showing the user this information in an overview approach, he will get a high-level understanding of the detected differences in the files. From this high-level understanding, he can make choices about where to begin the task of resolving the differences. The larger the files being compared are, and the larger the number of changes, the more beneficial it is to give the user some idea of the overall scope of the differences in this manner. For example, instead of merely starting with the first detected difference and proceeding sequentially through each difference until reaching the end, the user may prefer to begin with a part of the files having the lowest density of differences, or the part of the files having the smallest sized differences. Or, for example, the user may know that the simplest part of a particular file is at the end, and start with the differences detected nearer the end of the file. Conversely, instead of beginning with the simplest or smallest changes, the user may prefer to begin with the most difficult or the largest changes. The approach taken will depend on the nature of the files and their differences, and the user's particular preferences.

It will not be enough to provide this type of overview information in a "display-only" mode, however. To help the user work through the detected differences quickly and easily, a navigation tool is required with controls that allow the user to get to the particular difference he has decided to work on. When the overview is integrated with navigation controls that are defined specifically for the task of file comparison and difference resolution, then the user's productivity can be increased, the accuracy of his file changes can be increased, and the tedium of the change process can be minimized.

Accordingly, a need exists for a technique by which a user can quickly and efficiently navigate through detected differences between versions of a file, by using an abstract visual representation showing those differences in an overview approach. The overview should visually provide the user with a high-level understanding of where differences exist in files, the size of the differences, and the relative distribution of differences over the files as a whole. The proposed technique provides a visual abstraction of the detected differences in the files, and can be used with files containing any type of ordered data, such as text (for example, programming source code), audio, video, etc., and with any number of versions of a file.

SUMMARY OF THE INVENTION

An object of the present invention is to provide a technique whereby a user of a file comparison software application can quickly and efficiently navigate through detected differences between versions of a file, by using an abstract representation showing those differences in an overview approach.

Another object of the present invention is to provide this abstract representation visually, enabling the user to see where differences exist, how large the differences are, and how the differences are distributed throughout the files.

Still another object of the present invention is to provide a technique whereby this navigation approach can be used with files having any type of ordered data.

A further object of the present invention is to provide a technique that supports multiple views on the abstract representation of the detected differences, where one view includes all files in one composite representation and another view represents each file separately with the detected differences connected within the abstract representation.

Another object of the present invention is to provide a navigation tool that works with any number of compared versions of a file.

A further object of the present invention is to provide a number of navigation controls that are specific to the file comparison scenario.

Yet another object of the present invention is to accomplish the afore-mentioned benefits with a navigation tool that is integrated with a file comparison tool, so that navigation of the abstract representation causes corresponding positional changes in the file comparison tool and vice versa.

Accordingly, the present invention provides a system, technique, and method for implementing a fast and efficient visually-oriented technique for navigating through a comparison of different versions of a file in a computer environment, comprising a subprocess for displaying an additional window or pane beyond a file comparison window, where this additional window or pane is used to provide the navigation technique. This subprocess for displaying an additional window or pane further comprises a subprocess for displaying an abstract representation of the different versions in the window or pane. This abstract representation further comprises at least one graphical bar using at least two colors, wherein one of the colors is used to depict one or more segments where no differences were detected and a different one of the colors is used to depict one or more segments where differences were detected. The abstract representation further comprises at least two views, wherein a first view comprises a single composite abstraction of all the different versions, and a second view comprises a plurality of separate but connected abstractions of each of the different versions. Additionally, navigation controls may be provided that are tailored for use in the navigation technique. One of these navigation controls may provide for scaling the representation in the views. The versions of the file being compared may contain any type of ordered data. Optionally, hover help may be provided, wherein this hover help comprises displaying attributes or content information related to one of the difference segments when a user passes a pointing device over that difference segment.

Other objects and advantages of the present invention will be set forth in part in the description and in the drawings which follow and, in part, will be obvious from the description or may be learned by practice of the invention.

The present invention will now be described with reference to the following drawings, in which like reference numbers denote the same element throughout.

BRIEF DESCRIPTION OF THE DRAWINGS

FIG. 3 depicts a visual relationship between a window created by a file comparison tool, and the Navigation Window of the present invention, when the Content View is selected (showing all files in one composite abstract representation);

FIG. 4 depicts a visual relationship between a window created by a file comparison tool, and the Navigation Window of the present invention, when the Position View is selected (showing each file in a separate but connected manner within the abstract representation)

DESCRIPTION OF THE PREFERRED EMBODIMENT

Figure 1:
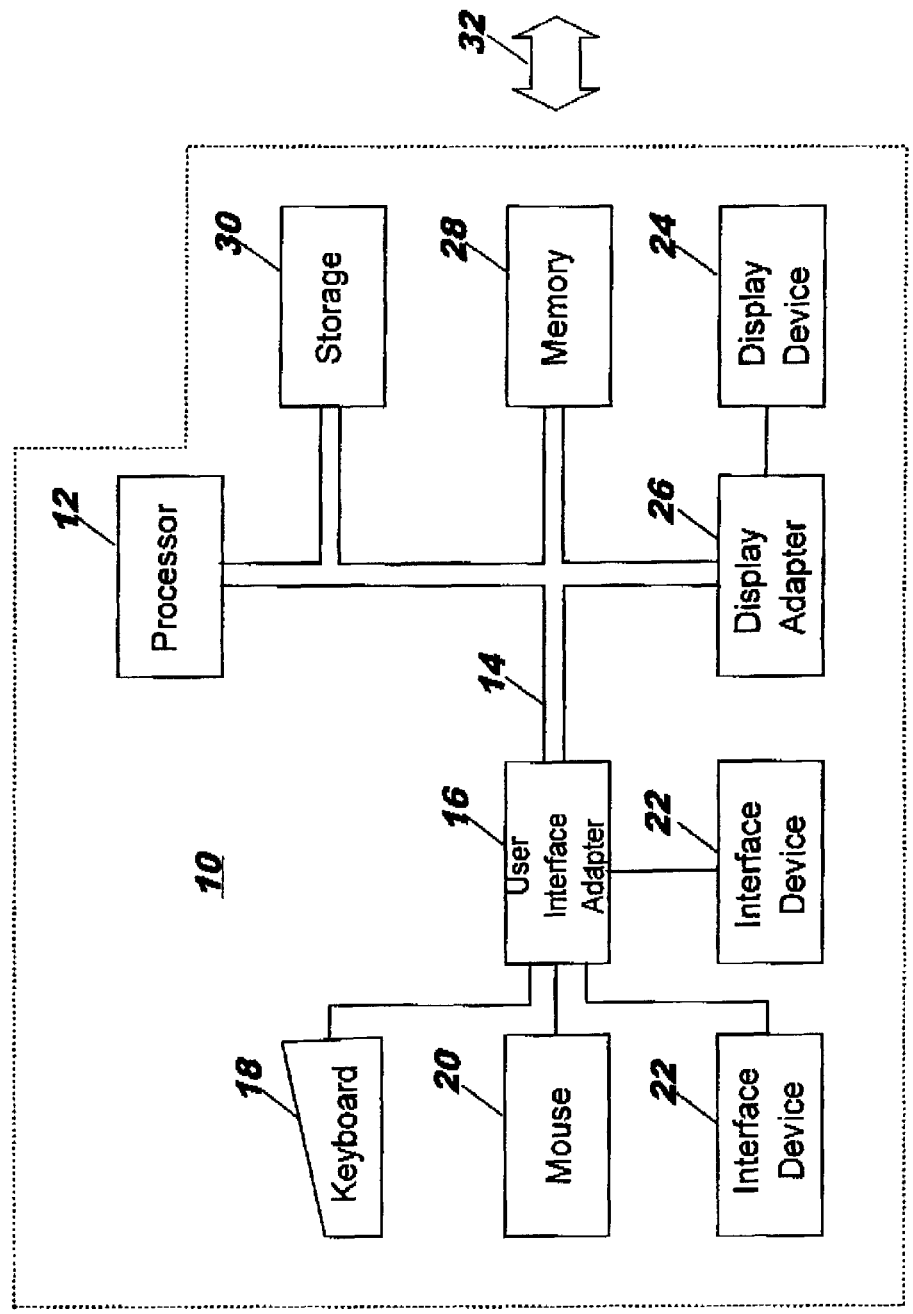
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network, the workstation 10 can be a client in a client/server arrangement with another computer, it may be a standalone computer not connected in a network, etc. All of these configurations, as well as the appropriate communications hardware and software, are known in the art.

Figure 2:
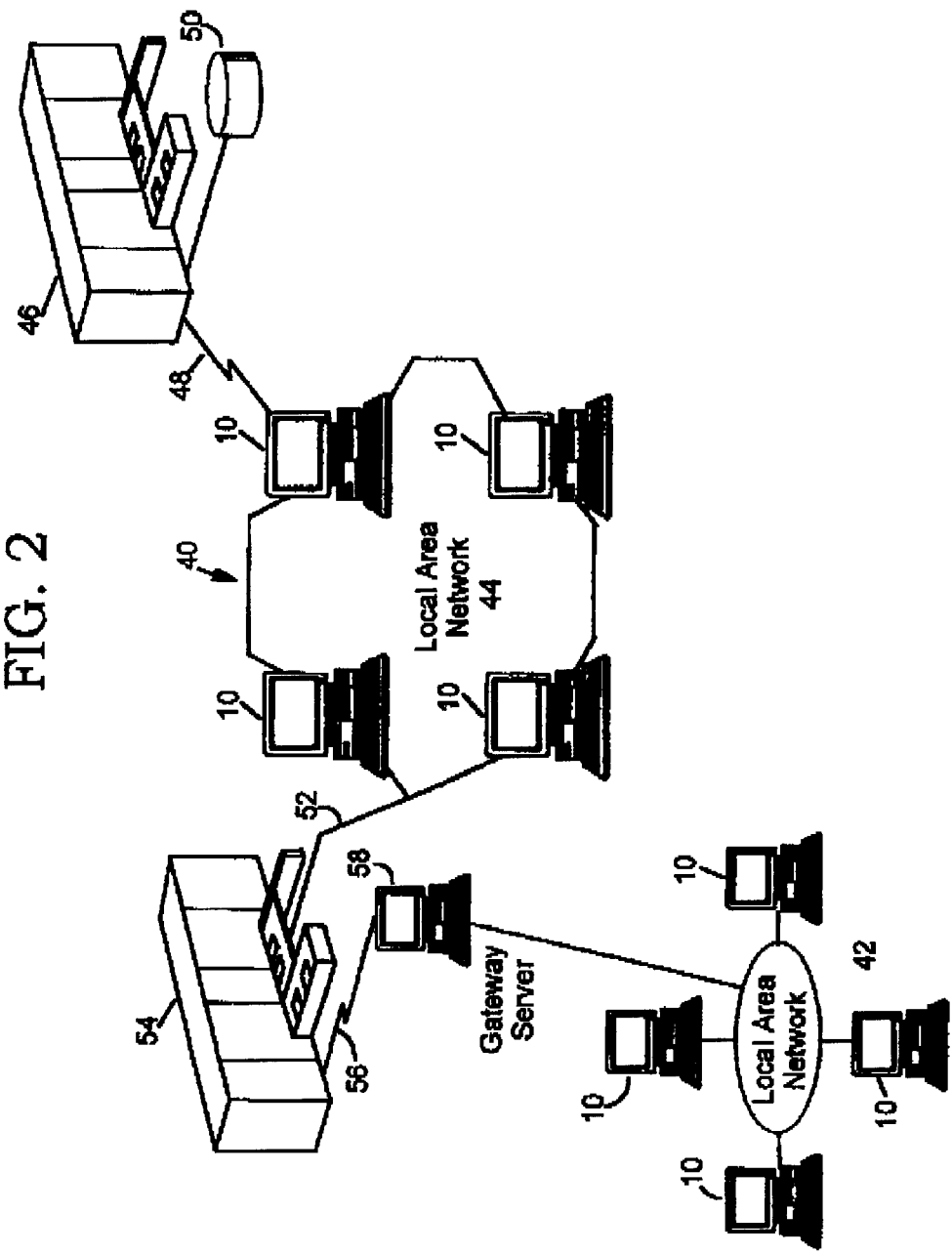
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The navigation window (or pane) resulting from use of the present invention may be displayed on any of the various display devices 24, and accessed using any type of interface device such as a keyboard 18, mouse 20, and/or other interface devices 22 (including a touch sensitive screen, digitized entry pad, etc.).

Figure 3:
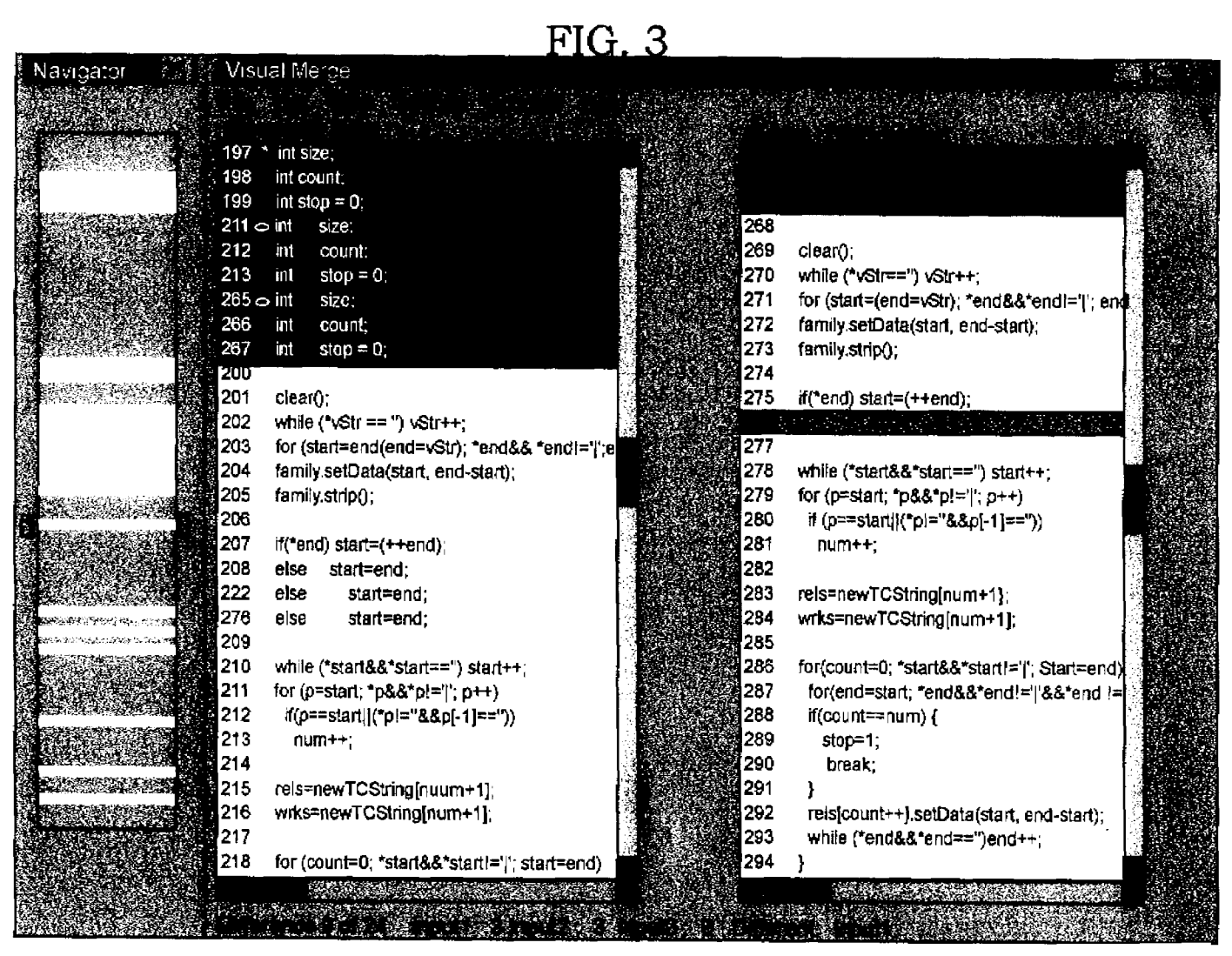
Figure 4:
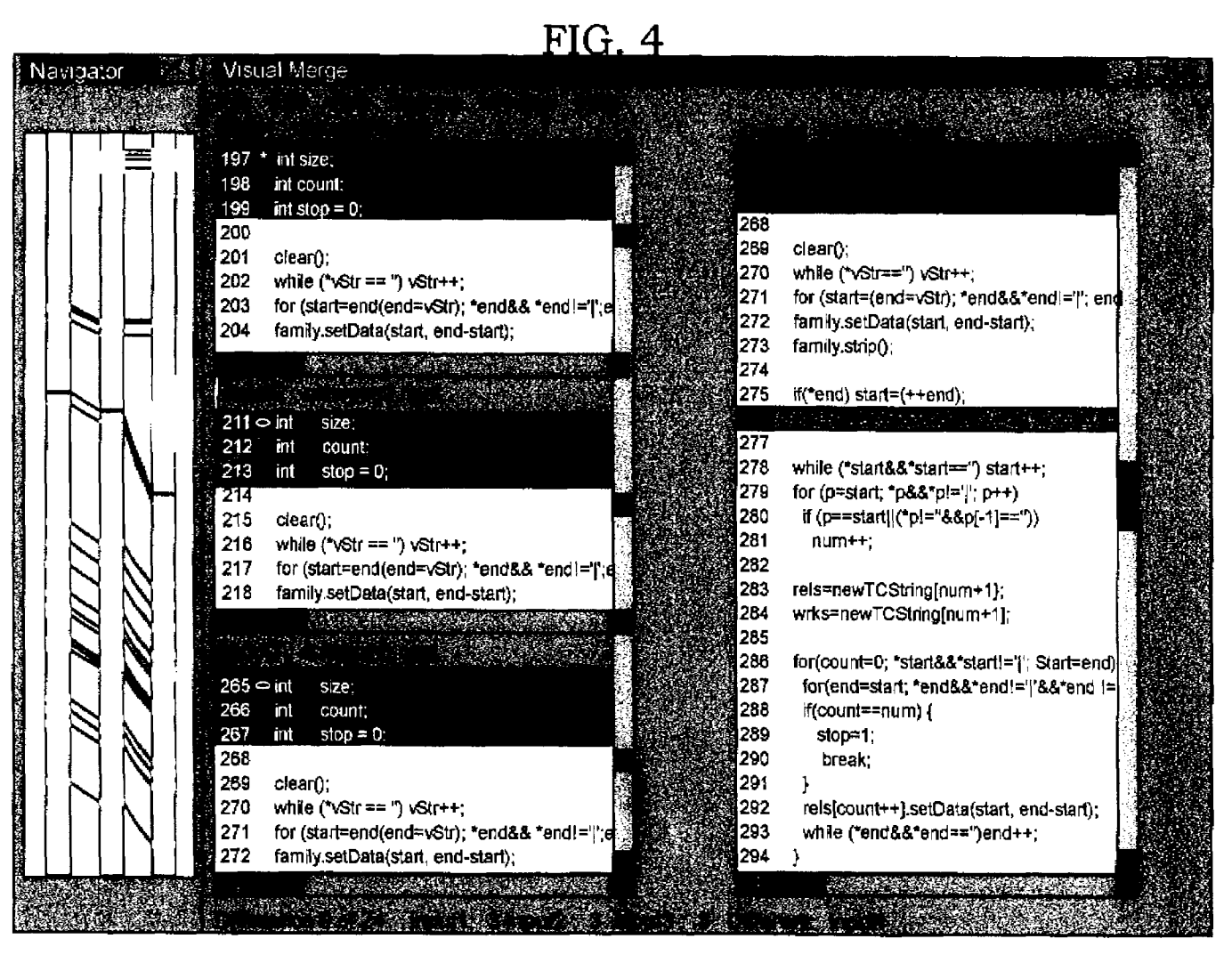

The preferred embodiment of the present invention will now be discussed with reference to FIGS. 3 through 5.

In the preferred embodiment, the present invention is implemented as a computer software program. The implementation of the invention may be used with any file comparison software application that has a graphical user interface, and which presents detected differences graphically to the user on a graphical user interface display to allow the user to select or view one or more such differences. The present invention will be integrated with the file comparison software, so that information on detected differences is available for creating the abstract overview, and so that each change in position in either the navigation window (or pane) of the invention, or the comparison window of the file comparison software, is reflected with a corresponding change in the other window. The resulting integrated application may execute entirely on the user's computer, as a stand-alone software package, or it may execute partly on the user's computer and partly on a remote computer. In the latter scenario, the remote computer may be connected to the user's computer through a LAN or a WAN that is part of a network owned or managed internally to the user's company, or the connection may be made to an external computer (for example, through the Internet using an Internet Service Provider).

The present invention solves the afore-mentioned navigation problems of existing file comparison tools by providing a window that is separate from the file comparison window used by an existing file comparison tool. This separate window contains an abstract overview of the detected differences, and allows the user to navigate through the differences using navigation controls in that window. This window is referred to herein as a "navigation window". (Alternatively, the information may be presented in a separate pane of the file comparison window, without deviating from the inventive concepts of the present invention. For ease of reference, the phrase "navigation window" will be used herein to refer to either of these presentation approaches.) The abstract representation presented in the navigation window is created using information generated by the file comparison tool. This information comprises the relative size, location, and distribution of differences that have been detected when comparing the files. This information is created by a typical file comparison tool as it detects differences.

The present invention is described in terms of comparison of versions of files. The inventive concepts are applicable to any type of ordered information that can be contained in a file. Thus, different versions of objects can be compared in an object-oriented programming environment, different versions of a multimedia file can be compared in a multimedia system, etc. Because the information will typically be stored on some type of medium (such as a disk or CD-ROM) as a file, the word "file" is used herein to describe the information as it has been stored. The comparison typically involves different versions of one file, where those different versions have been created at different times and may contain some number of differences. Each version will typically be stored as a separate file, having its own separate identifier (such as file name and file extension). Hereinafter, the word "versions" is used to indicate these multiple versions of one file, or the word "files" is used to equivalently represent the multiple files in which those versions are stored.

The user of an integrated file comparison software application having the navigation window and navigation controls of the present invention can quickly and efficiently navigate through compared versions of a file. The preferred embodiment will be described with reference to comparing text files, although the inventive concepts apply equally to comparing files containing any type of ordered data. For example, the present invention can be used with files containing binary encodings of audio or video, provided a file comparison tool that operates on binary data is available for integration with the navigation window and its controls.

In the preferred embodiment, two alternative views of the abstract representation of differences can be selected by the user. These views are referred to herein as the Content View and the Position View. While two views are defined for the preferred embodiment, other views may be used without deviating from the inventive concepts of the present invention.

In the content view, a single bar is displayed in the navigation window, where that bar presents a composite abstract representation of all files being compared. FIG. 3 shows an example of the content view. In the preferred embodiment, two colors are used when creating this bar. Segments of the bar using the first color ("Color 1") show that no difference was detected; segments using the second color ("Color 2") show that a difference was detected. The difference may be contained within a single line of the file, or may span a number of sequential lines, as is known in the art. Using this two-color approach, the content differences show up as Color 2 segments within the bar. In this view, the bar represents 100 percent of the file (or some other chosen percentage, if zooming is used as discussed below with reference to Step 300), and the size of the differences are scaled against the overall size of the bar. Thus the relative size, distribution, and relative location of the differences can be seen very easily. When more than two files are being compared, the bar in this view is a composite abstraction of the differences among those files. Color 1 represents segments where all the files have the same content. Thus, Color 2 indicates that some difference was detected between at least two versions of the files. In the preferred embodiment, the size of the Color 2 segment then represents the size of the largest of these difference segments. (For example, if a particular segment of text was absent in one version of a file, then 2 lines of text were added in the next version, and these 2 lines expanded to 5 lines in the next version, the composite abstraction represents the difference segment as being 5 lines long.)

In the position view, a separate bar is displayed in the navigation window for every file that is part of the comparison. The bars are scaled against the largest single file. The largest of the files is represented by a bar that is 100 percent (or some other percentage, when zooming), and the bars for the other files are scaled against that. The differences are also scaled against the largest file, using two colors in the same manner as the content view (using Color 1 to indicate no difference, and Color 2 to indicate that a difference was detected). Thus the relative size of the files and their differences, as well as the distribution of those differences, is visually indicated. The content differences among the files are visually linked, by drawing a thin line from a difference segment in one bar to the corresponding difference segment of the bars on each side of it. Thus the relative location of the difference segments within each file are shown by the position of the connected segments. FIG. 4 shows an example of the position view.

A third color ("Color 3") may optionally be used with both the content and the position views. Color 3 is used to represent the current difference. The current difference is the one being presented currently within the file comparison tool. Color 3 is used to highlight this difference segment on the bar(s) of the navigation window. Thus, as the user moves to the next or previous difference, Color 3 will also move to a different position on the bar(s). Likewise, the lines connecting the current difference in the position view are highlighted using thicker line segments.

The content bar and position bars of the present invention are preferably rectangular in shape. The bars may be positioned in a vertical alignment, as shown in FIGS. 3 and 4, or in a horizontal alignment in a horizontal navigation window (not shown). The bars shown in FIGS. 3 and 4 expand to fill the entire navigation window, although alternatively the bars could be larger or smaller than the window. Bars of different size are discussed below with reference to FIGS. 5A and 5B.

Alternatively, techniques other than use of multiple colors can be used to show differences and sameness, without deviating from the inventive concepts of the present invention. For example, when a color display device is not available, different shades of gray can be used, or hash marks of different patterns can be used. FIGS. 3 and 4 show the content and position views using white (Color 2) and two shades of gray (Colors 1 and 3, where the darker shade has been used here for Color 3) to represent the three different characteristics.

Figure 5A:
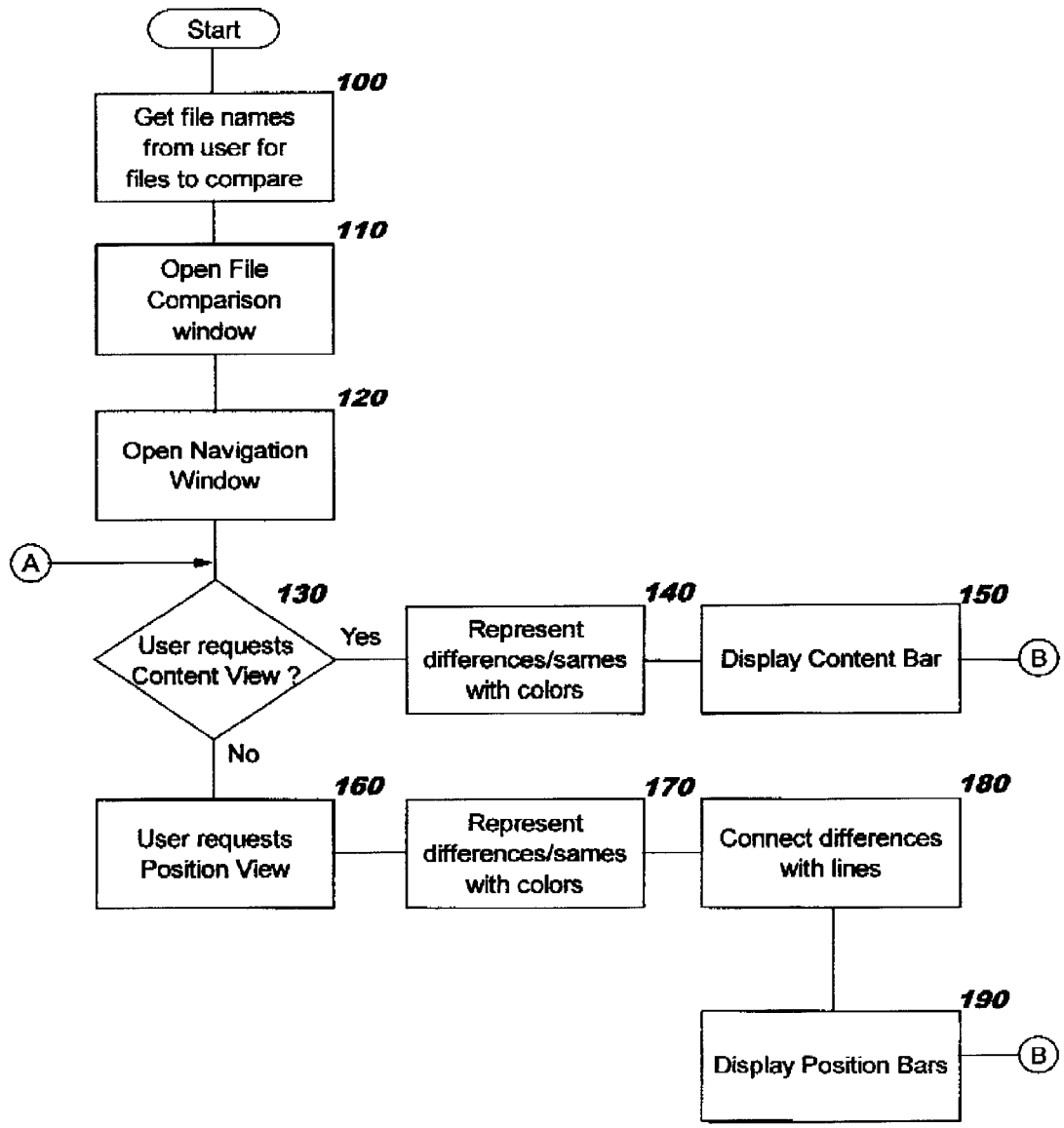
FIGS. 5A–5B illustrate a flow chart which sets forth the logic involved in using the present invention to examine and resolve detected differences in versions of a file.
Figure 5B:
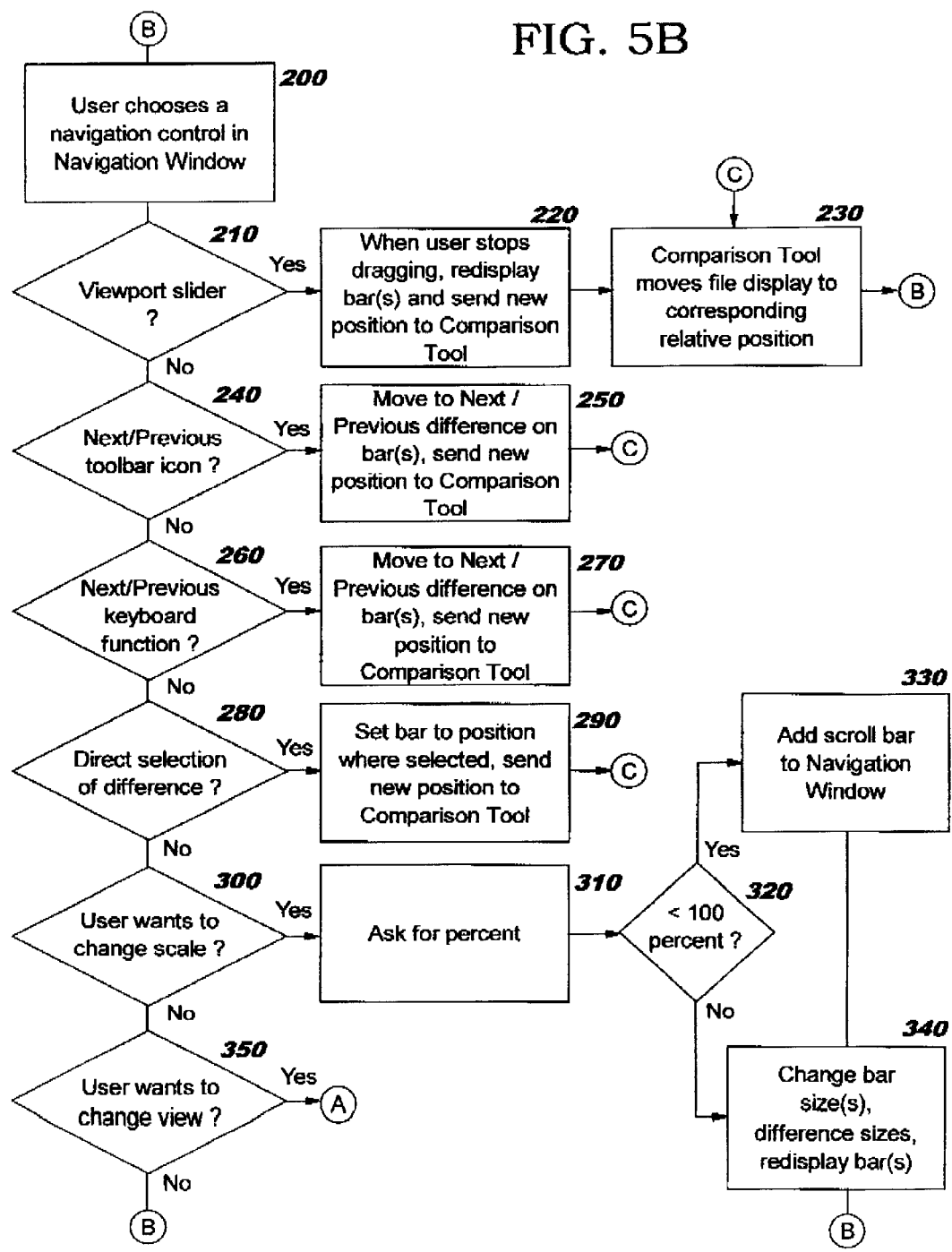

FIGS. 5A and 5B illustrate the logical steps followed when operating a software application that integrates the present invention with a file comparison tool. Design of a file comparison tool, and the techniques by which it detects differences in files, do not form part of the present invention, and will not be discussed herein.

The process begins at Step 100, by getting the names of the files the user wishes to compare. The manner of obtaining the file names does not form part of the present invention. The user may click on the individual files from a file directory window, he may type the file names into a prompting window, etc. What is required for operation of the present invention is that the names are somehow made known to the software application.

At Step 110, a window is opened for the File Comparison Tool that is integrated with the present invention. At Step 120, the Navigation Window of the present invention is opened. It will be obvious to one of ordinary skill in the art that the order of Steps 110 and 120 may be reversed, with no effect on the usefulness of the present invention.

Step 130 indicates that the user may choose to open the navigation window in the Content View. Alternatively, the navigation window may be opened in the Position View, as shown by Step 160. These two views are mutually exclusive. In the preferred embodiment, a default mode of operation is defined. The Content View is preferably the default, although facilities may be provided (using techniques that are well known in the art) to allow the user to set the default to the Position View. Further, the user may change the view at any time during operation of the present invention (see Step 350), which will invoke the appropriate process at Step 130 or Step 160.

When the Content View is used, the content bar will be formatted for display in the navigation window at Step 140, as previously discussed. When formatting the content bar for display, information on the differences detected by the comparison tool is used, as previously stated.

The size of the colored segments of a bar in the present invention is proportional to the overall size of the bar. That is, the size of a segment to create using Color 2 (the color for difference) depends on how large that particular detected difference is in relation to the overall size of the file. It will be obvious to one of ordinary skill in the art that the colors for difference segments and the colors for sameness segments alternate, representing that the files are the same for some portion of the file, then they are different, then they may be the same again, etc.

Once the bar has been formatted with the different colored segments, it is displayed at Step 150. Control then transfers to Step 200.

When control reaches Step 160, the user has chosen to see the abstract representation of file differences using the Position View. The process used for formatting and displaying the position bars in the position view is very similar to that just described for the content bar of the content view. When the position view is used, a position bar will be displayed in the navigation window for each version of the file that is being shown in the File Comparison tool window, as previously discussed. FIG. 4 shows an example of a position bar representing three versions of a file. When formatting the position bars for display, information on the differences detected by the comparison tool is used in the same manner as for the content view. Thus, the process of Step 170 is similar to the process in Step 140, except that in Step 170 the colored segments are created on separate bars. The size of the segments of the bars is based on the size of the difference within that file version, compared to the size of the largest file as a whole.

The position bars are displayed in the navigation window at Step 180.

A difference between the process used in creating the content bar and the position bars is represented by Step 190. At Step 190, the segments representing differences on each of the bars are connected. In the preferred embodiment, thin lines are used for the connections (with slightly thicker lines used for connecting the segments of the current difference), and the connection is made only to bars that are immediately to the left or right of each bar. (That is, there are no connections between bars that cross other bars.) The connections are made between difference segments that are related to each other. As can be seen in FIG. 4, sometimes there may not be a related difference segment. This is shown in FIG. 4 where bars 2 and 3 have connected difference segments, but bar 1 has no corresponding segment, so no line is drawn to bar 1 from a particular bar 2 segment. This will happen, for example, where a block of text did not exist in one version of a file (here, shown as bar 1), but was added to another version (represented here by bar 2), and then changed in yet another version (represented here as bar 3).

It will be obvious to one of ordinary skill in the art that the processes of the bar formatting and displaying at Steps 180 and 190 may be intermingled, without deviating from the inventive concepts of the present invention. For example, the position bars may be created in a memory buffer with colored segments, then have connecting lines drawn in that buffer representation, and then the buffer is displayed.

When the position bars have been formatted and displayed, control transfers to Step 200.

Control reaches Step 200 when the user has chosen a navigation control that is defined for use with the integrated navigation window and file comparison window according to the present invention. The logic shown at Steps 200–350 applies equally to using the content view and using the navigation view. There are a number of ways in which the user can choose a navigation control, using techniques that are well known in the art. For example, the user may click on a toolbar navigation icon with a pointing device such as a mouse, the user may touch a navigation button on a touch-sensitive screen, etc. The manner of communicating the user's choice to a software application is also well known in the art, and does not form part of the present invention.

The Steps 210, 240, 260, 280, 300, and 350 each represent navigation controls that are specifically defined for use with the present invention. Some of these controls are known in the art (for example, the Next and Previous icons); however, the controls are used in a novel manner with the present invention's navigation window. Other types of screen controls may be chosen by the user as he is examining detected differences, and resolving those differences, such as scrolling left or right within a window, paging up and down, etc. These screen controls are not represented in FIG. 5B because there is no corresponding processing that is specific to using them with the navigation window of the present invention.

At Step 210, a comparison is made to determine if the navigation control chosen by the user was the viewport slider. A viewport slider is a type of graphical control object that may be drawn as a rectangle or square on a bar, and that moves up and down on that bar. Viewport sliders are known in the art, and are typically used in software products such as text editors to indicate how much of the file is being viewed, and the relative position of the information currently displayed. In a text editor, the slider is typically positioned on the scroll bar of the text editing window. The user can "grab" this slider (for example, by positioning the mouse pointer over it, and pressing a mouse button) and drag it along the scroll bar. As the slider moves, the text being displayed in the text editing window will also move to a different part of the file, by an amount corresponding to the relative amount of slider movement.

As defined for the present invention, a separate viewport slider (beyond any positioned on the scroll bars of the file comparison windows) is displayed on the content bar of the navigation window, and may optionally be displayed on the position bars as well. This viewport slider will operate similarly to existing viewport sliders, except that this slider is located in the navigation window, and the files that are moving are located in the file comparison windows. That is, movement in the file comparison window display is linked directly to movement of the viewport slider from the navigation window. And conversely, when the user moves the file comparison window forward or backward, the viewport slider will move along the bar(s) of the navigation window in a corresponding direction. Thus, movement in the two windows is synchronized, regardless of which window the user indicates a movement change from. (This synchronization of movement applies to all the navigation controls of the present invention, not just the viewport slider.) Use of a viewport slider in this manner allows the user to quickly move around within the files being compared, by an amount that is under control of the user. The size of the viewport slider visually indicates to the user how much of the current files is being viewed within the file comparison window, relative to the overall file size. Therefore, the size of the slider varies inversely with the size of the file: when the file is very large, only a small portion of the file will fit in the file comparison window at one time, so the viewport slider is comparatively small; when the file is small, then the viewport slider is comparatively large.

Control transfers to Step 220 when the navigation control selected by the user was in fact the viewport slider. Step 220 indicates that when the user stops dragging this slider, the bar(s) in the navigation window may need to be redisplayed. This will depend on whether the user has previously zoomed the bars in the navigation window to some percent less than 100. If so, then not all of the difference segments were being shown on the bar(s). Depending on how far the user drags the viewport slider, the portion of the bar(s) being shown may no longer correspond to what is being shown in the file comparison window. In that case, a different segment of the bar formatted originally at Step 140 or 170 must be displayed as part of the redisplay operation. To synchronize the file comparison window with the position to which the user dragged the viewport slider in the navigation window, Step 220 also indicates that the new position information is sent to the comparison tool. This enables the comparison tool move its file displays accordingly at Step 230.

While Step 220 indicates that position information is "sent", the actual manner of conveying this information to the comparison tool depends on how the navigation window and file comparison tool integration is achieved. For example, the integration may be done by adding routines or modules to a file comparison tool, and compiling those as part of a single executable software application. In that situation, the information can be communicated by storing it in memory locations that are accessible to all the affected code modules, or the information can be passed as parameters on a procedure call or function invocation within the software application. Or, the integration may be done in such a way that the navigation tool logic is separately compiled from the file comparison tool. In that situation, the position information will typically be passed from one executable component to the other as a parameter (although shared memory locations could be defined here as well). Techniques for communicating information between executable routines are well known in the art.

Step 230 indicates that the comparison tool display moves, to synchronize with the navigation window display. This same logic applies when the navigation window movement occurs from using any of the navigation controls detected at Steps 210, 240, 260, or 280, and thus control transfers here as part of the processing of each of those controls. When Step 230 is finished, control returns to Step 200 to await the user's next navigation control choice.

Control reaches Step 240 when some control other than the viewport slider was chosen. A comparison is made to determine if the "Next Difference" or "Previous Difference" icon was selected from the toolbar of the navigation window. These icons allows the user to quickly navigate through the detected differences, by skipping over segments where the files are the same. When the test at Step 240 is positive, at Step 250 both the viewport slider and the comparison tool window will jump forward or backward, as appropriate, to the next or previous difference. Step 250 positions the slider at this new location, and sends information to the file comparison tool so that Step 230 can present the corresponding section of the files in the comparison tool.

Step 250 also displays the Color 3 highlighting for the current difference at the new location, when Color 3 is used. When the navigation window is in the content view, the current difference is highlighted within the new location of the viewport slider. When the navigation window is in the position view, the current difference is highlighted within the files of the comparison window and on the bars of the navigation window, and the corresponding links between the files are also highlighted. In the preferred embodiment, the links are highlighted by displaying them using a slightly thicker line than is used for all the other links, and the highlighting within the file comparison window may be done using any highlighting technique such as different font, different text color, different background color, etc. As discussed for Step 220, a different portion of the bar(s) may also need to be displayed at Step 250 if the user had previously zoomed to less than 100 percent. From Step 250, control transfers to Step 230.

At Step 260, a comparison is made to determine if the control selected by the user was the "Next Difference" or "Previous Difference" key of the keyboard. If the answer is positive, the processing at Step 270 is as defined above for Step 250. The only difference is that the user can navigate using keyboard controls instead of icons displayed on the screen.

At Step 280, a comparison is made to determine if the user directly selected a difference segment. The navigation window allows the user to do this direct selection using any type of pointing device such as a mouse, or via a touch-sensitive screen. The user points to the difference segment of interest, and then indicates selection of that segment (for example, by clicking on a mouse button or touching the screen). When the comparison at Step 280 is positive, Step 290 indicates that the location information on the bar(s) is changed to show the selected difference segment as being the current difference. As with the other navigation controls, this includes moving the viewport slider, changing the location of the current difference highlighting, and displaying a different portion of the bar(s) if the user had previously zoomed to less than 100 percent. From Step 290, control transfers to Step 230.

At Step 300, a comparison is made to determine if the user requested to change the scale of the bars shown in the navigation window. If this comparison is positive, control transfers to Step 310.

By default, the bars of the navigation window are scaled to 100 percent of the largest file of the comparison, as discussed earlier. For various reasons, the user might want to adjust this percentage, giving a different granularity to the information being viewed in the abstract representation. A scaling option is provided by the preferred embodiment (although the inventive concepts of the present invention apply equally to an embodiment that does not provide such an option). This scaling option can be thought of as providing "zoom" capability, whereby the user can zoom in or zoom out on the display of the abstract representation. The concept of zooming in and out is well known in the art. In the preferred embodiment, the toolbar of the navigation window includes an icon the user can select to request changing the scaling factor for zooming. According to this embodiment, the user will be asked to enter a new scaling factor at Step 310, where the factor is represented as a percent. In an alternative embodiment, more than one icon could be used, where one allows zooming in and another allows zooming out. Further, predefined amounts of percentage change could be associated with each click on the corresponding zooming icon.

As shown in Step 320, different processing is needed depending on whether the user selects a percent less than or greater than 100. Selecting a percent less than 100 corresponds to zooming in: whereas the bar representing 100 percent of the file size occupied the entire available length (if using a vertical display such as in FIG. 3 or 4) or width (if using a horizontal display) of the navigation window, now the entire bar will not be shown. Thus, Step 330 adds a scroll bar to the navigation window, in accordance with commonly-accepted techniques for displaying information in a window. If the user chose a percent greater than (or equal to) 100, corresponding to zooming out (or not zooming, respectively), it is not necessary to display a scroll bar because the entire bar(s) will still fit in the navigation window.

At Step 340, regardless of whether the new percent being used for the scaling factor is greater or less than 100, the bar must be re-sized and reformatted for redisplay. All the Color 1 and Color 2 segments are re-sized, to visually reflect their relative proportion in terms of the new overall size of each bar. Once this reformatting is finished, the new bar(s) are displayed. Note that there is no corresponding information to be sent to the file comparison tool, because changing the scaling factor does not move any positioning controls in the navigation window from the relative positions before the change. Thus, control returns directly to Step 200.

At Step 350, a comparison is made to determine if the user requested to change the view. If the answer is positive, then control returns to Step 130, where the view selection processing begins. Otherwise, the user's choice is not one of the navigation controls for which the present invention is specially adapted. FIG. 5B shows control transferring back to Step 200, although it will be obvious that the user's choice is first processed using techniques that do not form part of the present invention.

In an optional feature of the present invention, hover help may be provided to assist the user in deciding which difference segment to select. Hover help techniques are well known in the art, and are manifested by displaying a small graphic object that may be shaped like a bubble, and which temporarily pops up nearby when the user passes the pointing device over some other graphical object for which this type of help is defined. The small pop-up object typically gives a short explanation of the meaning or function of that graphical object. In the present invention, a novel hover help technique is defined that is specific to the file comparison environment, and which would be useful as a preliminary step with any of the navigation controls. When the user moves the pointing device over a difference segment, hover help causes the small pop-up object to be positioned near that difference segment. In this pop-up object, attributes related to that difference may be displayed. The attributes will depend on the type of files being compared. When text files are compared, one attribute will be the number of different lines in the difference segment. When binary files are being compared, one attribute may be the number of bytes in the difference segment. For any type of file content, an attribute may be the relative sequence number of this difference segment. When more than 2 files are being compared, another attribute may be the relative number of the version(s) which is/are difference from the others. Instead of (or in addition to) attributes, the hover help function may display content information about the difference segment. This is done by highlighting the portion of the file comparison displays corresponding to the difference segment over which the pointing device was moved. This highlighting may be done using any technique which serves to call attention to the difference, such as using a different font, different text color, different background color, etc. While the processing for the hover help is not shown in FIG. 5B, it will be obvious to one of ordinary skill in that art that an additional comparison step can be added, with a corresponding processing block that performs the hover help display functions and then transfers control back to Step 200. These additional steps can be located anywhere in the mainline processing that extends from Step 200.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. In a computing environment, computer readable code for implementing a fast and efficient visually-oriented technique for navigating through a comparison of different versions of a file, said computer readable code comprising:
   a subprocess for displaying an additional window or pane beyond a file comparison window, said additional window or pane being used to provide said navigation technique, and displaying an abstract representation of said different versions in said window or pane.

2. Computer readable code for implementing the technique according to claim 1, wherein said subprocess for displaying an abstract representation further comprises creating at least one graphical bar using at least two colors, wherein one of said colors is used to depict one or more segments where no differences were detected and a different one of said colors is used to depict one or more segments where differences were detected.

3. Computer readable code for implementing the technique according to claim 2, wherein said subprocess for displaying an abstract representation further comprises creating at least two views on said abstract representation, wherein a first of said views comprises a single composite abstraction of all said different versions, and a second of said views comprises a plurality of separate but connected abstractions of each of said different versions.

4. Computer readable code for implementing the technique according to claim 3, further comprising a subprocess for providing navigation controls tailored for use in said navigation technique.

5. Computer readable code for implementing the technique according to claim 4, wherein one of said navigation controls provides for scaling said views.

6. Computer readable code for implementing the technique according to claim 1, wherein said versions of said file contain any type of ordered data.

7. Computer readable code for implementing the technique according to claim 2, further comprising a subprocess for providing hover help, wherein said hover help comprises displaying attributes or content information related to one of said difference segments when a user of said computer readable code passes a pointing device over said difference segment.

8. A system for implementing a fast and efficient visually-oriented technique for navigating through a comparison of different versions of a file in a computing environment, comprising:
   means for displaying a file comparison window; and
   means for displaying an additional window or pane, said additional window or pane being used to provide said navigation technique, and displaying an abstract representation of said different versions in said window or pane.

9. The system for implementing the technique according to claim 8, wherein said means for displaying an abstract representation further comprises creating at least one graphical bar using at least two colors, wherein one of said colors is used to depict one or more segments where no differences were detected and a different one of said colors is used to depict one or more segments where differences were detected.

10. The system for implementing the technique according to claim 9, wherein said means for displaying an abstract representation further comprises creating at least two views on said abstract representation, wherein a first of said views comprises a single composite abstraction of all said different versions, and a second of said views comprises a plurality of separate but connected abstractions of each of said different versions.

11. The system for implementing the technique according to claim 8, wherein said versions of said file contain any type of ordered data.

12. The system for implementing the technique according to claim 9, further comprising means for providing hover help, wherein said hover help comprises displaying attributes or content information related to one of said difference segments when a user of said system passes a pointing device over said difference segment.

13. A method for implementing a fast and efficient visually-oriented technique for navigating through a comparison of different versions of a file in a computing environment, comprising the step of:
   displaying an additional window or pane beyond a file comparison window, said additional window or pane being used to provide said navigation technique, and displaying an abstract representation of said different versions in said window or pane.

14. The method for implementing the technique according to claim 13, wherein said displaying an abstract representation step further comprises creating at least one graphical bar using at least two colors, wherein one of said colors is used to depict one or more segments where no differences were detected and a different one of said colors is used to depict one or more segments where differences were detected.

15. The method for implementing the technique according to claim 14, wherein said displaying an abstract representation step further comprises creating at least two views on said abstract representation, wherein a first of said views comprises a single composite abstraction of all said different versions, and a second of said views comprises a plurality of separate but connected abstractions of each of said different versions.

16. The method for implementing the technique according to claim 13, wherein said versions of said file contain any type of ordered data.

17. The method for implementing the technique according to claim 14, further comprising providing hover help, wherein said hover help comprises displaying attributes or content information related to one of said difference segments when a user of said method passes a pointing device over said difference segment.

* * * * *